US011035345B2

(12) United States Patent
Schledde et al.

(10) Patent No.: US 11,035,345 B2
(45) Date of Patent: Jun. 15, 2021

(54) DEVICE AND ARRANGEMENT FOR THE HORIZONTAL PREASSEMBLY OF A WIND TURBINE ROTOR

(71) Applicant: SENVION GmbH, Hamburg (DE)

(72) Inventors: Bernd Schledde, Rietberg (DE); Jan Lütjen, Lütjenwestedt (DE)

(73) Assignee: SENVION GmbH, Hamburg (DE)

( * ) Notice: Subject to any disclaimer, the term of this patent is extended or adjusted under 35 U.S.C. 154(b) by 17 days.

(21) Appl. No.: 15/611,420

(22) Filed: Jun. 1, 2017

(65) Prior Publication Data
US 2017/0350371 A1 Dec. 7, 2017

(30) Foreign Application Priority Data
Jun. 1, 2016 (DE) .......................... 102016006572.9

(51) Int. Cl.
F03D 13/10 (2016.01)
F03D 1/06 (2006.01)
F03D 13/20 (2016.01)
E02D 27/42 (2006.01)
E04H 12/34 (2006.01)

(52) U.S. Cl.
CPC .......... *F03D 13/10* (2016.05); *E02D 27/425* (2013.01); *E04H 12/34* (2013.01); *F03D 1/0658* (2013.01); *F03D 13/20* (2016.05); *F05B 2230/61* (2013.01); *F05B 2240/221* (2013.01); *F05B 2240/912* (2013.01); *Y02E 10/72* (2013.01); *Y02E 10/728* (2013.01); *Y02P 70/50* (2015.11)

(58) Field of Classification Search
CPC .......... F03D 13/10; F03D 13/40; F03D 13/20; F03D 80/50; Y02P 70/523; Y02E 10/728; B66C 1/108
See application file for complete search history.

(56) References Cited

U.S. PATENT DOCUMENTS

| 6,283,315 B1 * | 9/2001 | Willim ................... B66C 23/76 212/196 |
| 7,276,808 B2 | 10/2007 | Weitkamp et al. |
| 8,528,735 B2 * | 9/2013 | Nies ....................... B66C 1/108 206/521 |
| 8,640,340 B2 * | 2/2014 | Foo ...................... B63B 35/003 114/259 |

(Continued)

FOREIGN PATENT DOCUMENTS

| DE | 10 2012 201 088 | 7/2013 |
| EP | 2256079 | 1/2010 |

(Continued)

OTHER PUBLICATIONS

Search Report dated Feb. 9, 2017 directed to German Application No. 10 2016 006 572.9; 8 pages.

*Primary Examiner* — Brian E Glessner
*Assistant Examiner* — Daniel J Kenny
(74) *Attorney, Agent, or Firm* — Morrison & Foerster, LLP

(57) ABSTRACT

An adapter device for the horizontal preassembly of a wind turbine rotor includes a connection piece on the underside of the adapter device for fastening the adapter device to a tower system of a tower crane, and a rotor flange on the top side of the adapter device for fastening the rotor hub of the wind turbine rotor to be assembled.

16 Claims, 4 Drawing Sheets

(56) References Cited

U.S. PATENT DOCUMENTS

| | | | |
|---|---|---|---|
| 8,661,668 B2* | 3/2014 | Vandenbulcke | F03D 13/40 |
| | | | 29/281.4 |
| 8,845,297 B2* | 9/2014 | From | F03D 1/0658 |
| | | | 416/244 R |
| 2011/0132239 A1 | 6/2011 | Poulsen et al. | |
| 2012/0027523 A1* | 2/2012 | Vanderbeke | E02B 17/021 |
| | | | 405/195.1 |
| 2012/0195768 A1* | 8/2012 | Van Nood | F03D 13/10 |
| | | | 416/244 R |
| 2013/0223964 A1* | 8/2013 | Zheng | E04H 12/34 |
| | | | 414/560 |
| 2014/0341742 A1 | 11/2014 | Knoop et al. | |
| 2016/0076320 A1* | 3/2016 | Sherwood | E21B 21/06 |
| | | | 166/379 |
| 2017/0074246 A1* | 3/2017 | Richert | F03D 7/0208 |

FOREIGN PATENT DOCUMENTS

| | | |
|---|---|---|
| EP | 2 778 389 | 9/2014 |
| JP | 2005-343652 | 12/2005 |
| JP | 2007-503539 | 2/2007 |
| KR | 10-1614497 | 4/2016 |
| WO | WO-2015/032407 | 3/2015 |

* cited by examiner

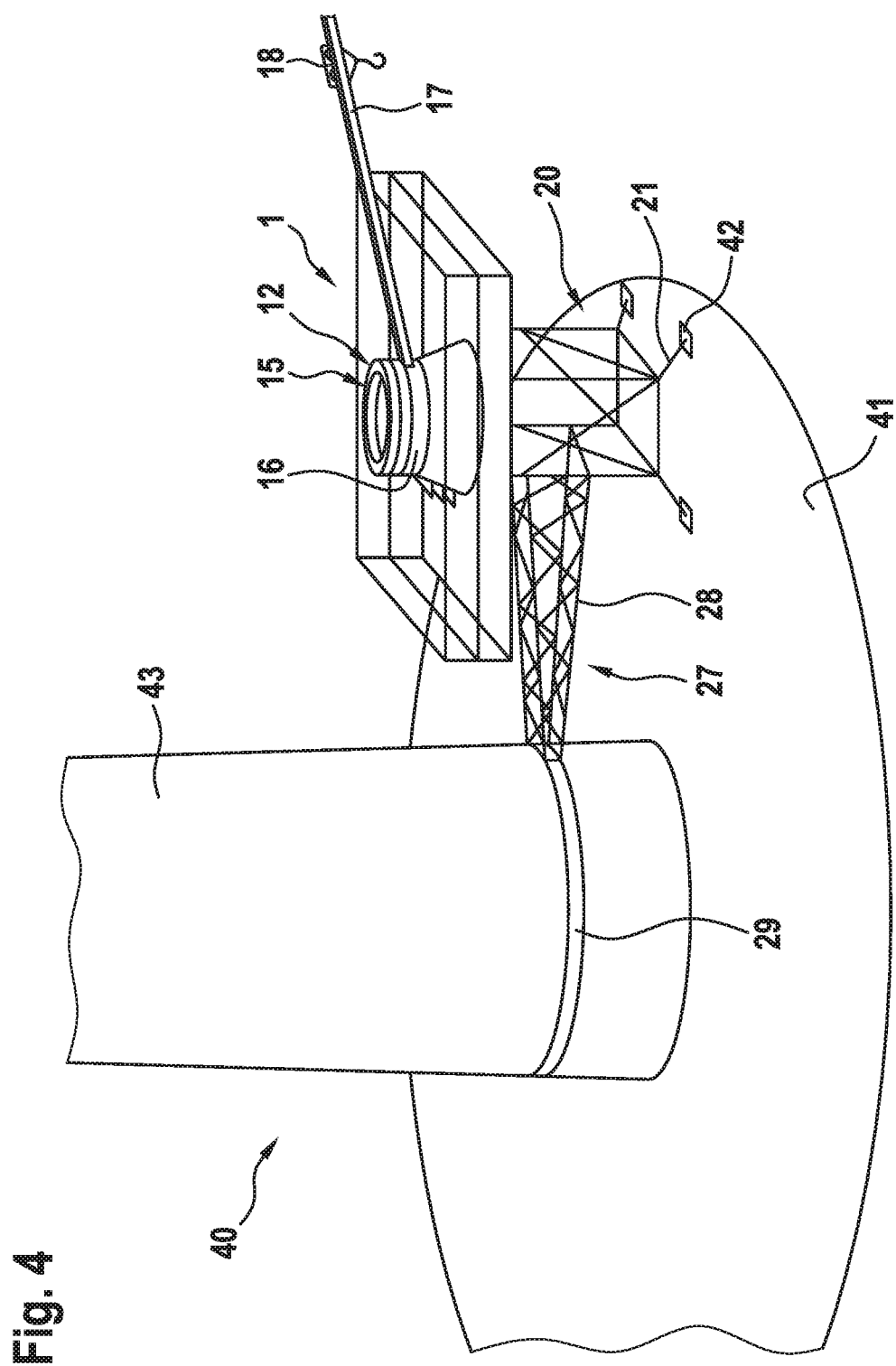

DEVICE AND ARRANGEMENT FOR THE HORIZONTAL PREASSEMBLY OF A WIND TURBINE ROTOR

CROSS REFERENCE TO RELATED APPLICATION

This application claims priority to German Application No. 10 2016 006 572.9 filed Jun. 1, 2016, of which is hereby incorporated by reference in the present disclosure in its entirety.

FIELD OF THE INVENTION

The invention relates to a device and an arrangement for the horizontal preassembly of a wind turbine rotor.

BACKGROUND OF THE INVENTION

When wind turbines are erected, it is a known procedure, as one of several possibilities, to preassemble the rotor of the wind turbine, comprising the rotor hub and the rotor blades, on the ground in a lying position, and subsequently to move the rotor as a whole up to the gondola mounted on the tower, with the aid of an assembly crane, and fasten it there.

In order to be able to preassemble a rotor in a lying position, various devices are known from the prior art.

For offshore wind turbines, floating platforms and/or platforms that are able to be placed on stilts on the seabed are known for example from EP 2 778 389 A1, assembly aids being arranged on the top side of said platforms and the rotor hub first of all being fastened to said assembly aids with the rotor hub axis in a vertical orientation, before the individual rotor blades are fastened thereto. The forces and moments acting on the assembly aid during assembly can be transferred into the seabed via the platform on account of the fixed connection of the assembly aid. On account of the large size of the platform, the dimensions of which are generally in the order of the length of a rotor blade of the wind turbine to be assembled, in particular the moments can be readily transferred with an only partially assembled rotor. However, embodiments are known in which the rotor blades assembled on the rotor hub have to be supported by additional shoring in order to relieve the assembly aid.

For onshore wind turbines, assembly aids are known to which a rotor hub can be fastened close to the ground with the rotor hub axes in a vertical orientation, before the rotor blades are fastened to the rotor hub. In order to balance moments acting on the assembly aid which arise in particular when not all of the rotor blades have yet been assembled on the rotor hub, various possibilities are known. Firstly, the individual rotor blades that have already been assembled can be supported by additional assembly supports such that they only exert a small moment, if any, on the rotor hub. It is also possible for the assembly aid to have long support legs which extend in a star shape in order in this way to enlarge the supporting area of the assembly aid. Alternatively, it is possible to configure the assembly aid with a high dead weight.

A common feature of the known assembly aids for the rotor of onshore wind turbines is that they are sometimes complicated special constructions which regularly require high transport costs for transport from one installation site to the next. The high transport costs result from the high mass of the assembly aid, in particular when the assembly aid has a high dead weight for balancing moments that arise during assembly, large dimensions, in particular when long support legs are provided, or, in particular in the case of additional assembly supports, in the number of required components and the required transport volume resulting therefrom.

On account of the fact that the rotor is assembled close to the ground in the case of the assembly aids known from the prior art, the additional problem arises that, during the assembly of the rotor up to the mounting thereof on the gondola of the wind turbine, the assembly space for the rotor, which is arranged in principle directly next to the foundation or the tower of the wind turbine for subsequent mounting on the gondola, constrains the construction zone or greatly limits the freedom of movement therein.

SUMMARY OF THE INVENTION

An object of aspects of the present invention is to create a device and an arrangement for the horizontal preassembly of a wind turbine rotor, in which the drawbacks of the prior art no longer arise or only arise to a reduced extent.

Accordingly, aspects of the invention relate to an adapter device for the horizontal preassembly of a wind turbine rotor, having a connection piece on the underside of the adapter device for fastening the adapter device to a tower system of a tower crane, and a rotor flange on the top side of the adapter device for fastening the rotor hub of the wind turbine rotor to be assembled.

Furthermore, aspects of the invention relate to an arrangement comprising an adapter device according to the invention and a tower system of a tower crane, wherein the adapter device is fastened to the tower system of the tower crane by way of its connection piece.

First of all, a number of expressions used in conjunction with the invention will be explained.

"Tower system of a tower crane" denotes the system for constructing the tower of a rotating tower crane that is employable in a mobile manner, in particular of a rotating tower crane that rotates at the top. Corresponding tower systems are supplied by various manufacturers and comprise a base segment on which individual tower segments are arranged, in order ultimately to form the tower of the crane with a desired height. The individual segments—base and tower segments—are in this case configured and dimensioned such that they can be transported readily by truck to the desired installation site of the tower crane and comprise interfaces for connected to further segments. The base segment generally comprises height-adjustable legs for compensating for irregularities of the installation area and can conferred stability on the tower crane either by sufficient ballasting or by being connected to a prepared foundation.

The "plane of the rotor flange" means that plane which is formed by the supporting surface of the flange on which the rotor hub comes to lie.

Because the adapter device according to aspects of the invention builds on known tower systems that are furthermore generally locally available, various advantages are achieved compared with the prior art.

Since it is possible, in the case of the device and arrangement according to aspects of the invention, to draw on locally generally available tower systems, the transport of the assembly aid for the rotor of a wind turbine from one installation site to the next is limited to the adapter device. The tower system can be provided locally, for example by local companies for hiring high tower cranes with suitable tower systems. In this way, it is possible to avoid the need to transport a large transport volume and/or a high transport weight over sometimes long distances.

Furthermore, the use of the adapter device according to aspects of the invention on a tower system allows the rotor to be assembled at a distance from the ground. Because the tower system comprising a base segment and at least one tower segment already necessarily has a certain height, a wind turbine rotor assembled on an adapter device arranged on said tower system is spaced apart from the ground such that it is regularly possible to at least pass under the rotor. As a result of the possible provision of further tower segments in the tower system, the distance between the ground and rotor can also be selected methodically such that any desired clearance height, for example in order to ensure that vehicles or other equipment can pass through, is achieved. It is also possible to assemble the rotor above existing obstacles, such as trees, so that the latter do not have to be removed, for example by felling. In addition, the assembly device allows rotor assembly on a slope in that the rotor is raised to such an extent that the blades directed towards the slope can be positioned horizontally.

In particular compared with the prior art, in which the assembly aid requires long support legs, in the arrangement according to aspects of the invention, a much smaller ground area is furthermore required. Consequently, the costs for leveling and consolidating the area required for the preassembly of the rotor can generally also be reduced.

The connection piece for fastening the adapter device to a tower system of a tower crane can be adapted individually to a particular tower system. However, it is preferred for the connection piece to be configured such that it can be connected to different tower systems, for example from different manufacturers. As a result, the adapter device is employable in a variable manner.

It is preferred for the connection piece and the rotor flange to be arranged substantially coaxially. This ensures that at least the weight force of a rotor fully assembled on the rotor flange can be transferred into the tower system, without undesired (bending) moments arising in the adapter device or the tower system in the process.

It is preferred for a work platform that surrounds the rotor flange to be provided between the connection piece and rotor flange. This work platform allows the access, required for assembling the rotor, to the rotor flange or a rotor hub mounted thereon, in particular since the assembly of the rotor with the adapter device according to the invention does not generally take place close to the ground. The work platform preferably complies with the respectively relevant HSE (Health, Safety and Environment) requirements. To this end, the work platform can be provided for example with an encircling railing and/or a nonslip surface.

It is preferred for the rotor flange to be arranged in an elevated manner with respect to the work platform, such that a passage from the work platform to an access opening, arranged in the region of the connection piece, in the work platform is provided between the rotor flange and work platform. By way of the access opening and the passage adjoining the latter, it is possible to access the work platform via the ladders generally provided in tower systems of tower cranes. A separate access point, for example via an s additional ladder, is then superfluous.

In particular when the rotor flange is arranged in an elevated manner with respect to the work platform, it is preferred for a staircase from the work platform to the rotor flange to be provided. Via the staircase, a rotor hub mounted on the rotor flange, or the manhole thereof, is readily reachable and accessible. If the staircase is connected fixedly to the adapter device, working safety is improved as a result compared with, for example, loosely installed ladders.

It is preferred for the adapter device to have an extension arm to which a ballast weight for applying a bending moment to the adapter device parallel to the plane of the rotor flange is able to be fastened. Via the extension arm and ballast weights optionally fastened thereto, moment loads on the adapter device, which can arise in particular during the assembly of the rotor on account of the successively occurring fastening of the rotor blades to the rotor hub, can be balanced.

The extension arm is preferably pivotable parallel to the plane of the rotor flange. Pivotability can be achieved in this case for example through the provision of a rotatably mounted ring, to which the extension arm is fastened. Alternatively, it is possible to configure the extension arm such that it is able to be mounted in one of preferably several defined positions. In this case, the extension arm can be mounted in the position required for balancing moment loads on the adapter device and be subjected to ballast weight.

Preferably, the extension arm has a displacement device for displacing the ballast weight along the longitudinal axis of the extension arm. By way of a corresponding displacement device, it is possible to set the moment that acts on the adapter device through the ballast weight.

If necessary, a rotating device can be fastened to the rotor flange of the adapter device, the rotor hub of the wind turbine rotor to be assembled being able to be fastened in turn to said rotating device, wherein the rotating device allows the rotor hub to rotate in the plane of the rotor flange. Since the rotating device is preferably configured as a separate component that is able to be fastened to the rotor flange, it can optionally be provided only in cases in which a rotation of the rotor hub or of the rotor is actually necessary during assembly, for example on account of particular conditions at the installation site. However, it is also possible to provide the rotating device as an integral part of the adapter device.

The adapter device is preferably foldable and/or telescopic such that, in the collapsed state, it has external dimensions of at most 2.5 m×2.75 m×10 m, preferably that the external dimensions are selected such that the adapter device can be loaded in a 40 foot standard container, more preferably in a 20 foot standard container. The adapter device can thus be collapsed to a transport volume which allows problem-free transport without an oversize, in particular by road and/or ship.

To explain the arrangement according to the invention, reference is first of all made to the preceding statements.

The tower system can be embodied such that its stability is achieved via ballasting of the tower system. The requisite ballast should in this case be suitably selected for the weight and the size of the rotor to be assembled and is preferably arranged in the lower region of the tower system, in particular at the foot of the tower system.

Alternatively, it is possible to fasten the tower system directly to the foundation of the wind turbine to be erected. To this end, when the foundation of the wind turbine is erected, suitable attachment points are provided, to which the tower system can be fastened. In this case, the tower system and the adapter device are configured and arranged such that the rotor can be assembled parallel to the tower of the wind turbine. It is also possible to construct a separate foundation for the tower segment.

It is also possible for the adapter device or the tower system to be configured to be supported preferably on the same foundation at least partially on the already erected tower of the wind turbine. To this end, a suitable support can be fastened to the tower of the wind turbine. The support can, for this purpose, have in particular a collar which is placed around the tower of the wind turbine. However, it may also be sufficient for the support only to lean against the tower, such that the support can absorb only pressure forces. It is also possible to provide an attachment of the tower system to the tower, in which case a form- and force-fitting connection between the tower system and tower is created.

The tower system is preferably selected such that the minimum clearance height under a wind turbine rotor assembled on the adapter device is at least 4.5 m, preferably at least 8 m, more preferably at least 9.5 m. To this end, the tower system can comprise for example a plurality of tower segments in order to achieve the ultimately desired clearance height.

At the same time, it is preferred for the maximum height of a wind turbine rotor assembled on the adapter device above the ground to be 40 m, preferably 35 m, more preferably 25 m. A corresponding maximum height can ensure that the wind turbine rotor is able to be assembled with comparatively small or low cranes and a large crane is used only for mounting the preassembled rotor on the gondola of the wind turbine.

BRIEF DESCRIPTION OF THE DRAWINGS

The invention will now be described by way of example by way of advantageous embodiments with reference to the appended drawings, in which:

FIG. 4 shows a second exemplary embodiment of an arrangement according to the invention having an adapter device according to the invention.

DETAILED DESCRIPTION OF THE INVENTION

Figure 1:
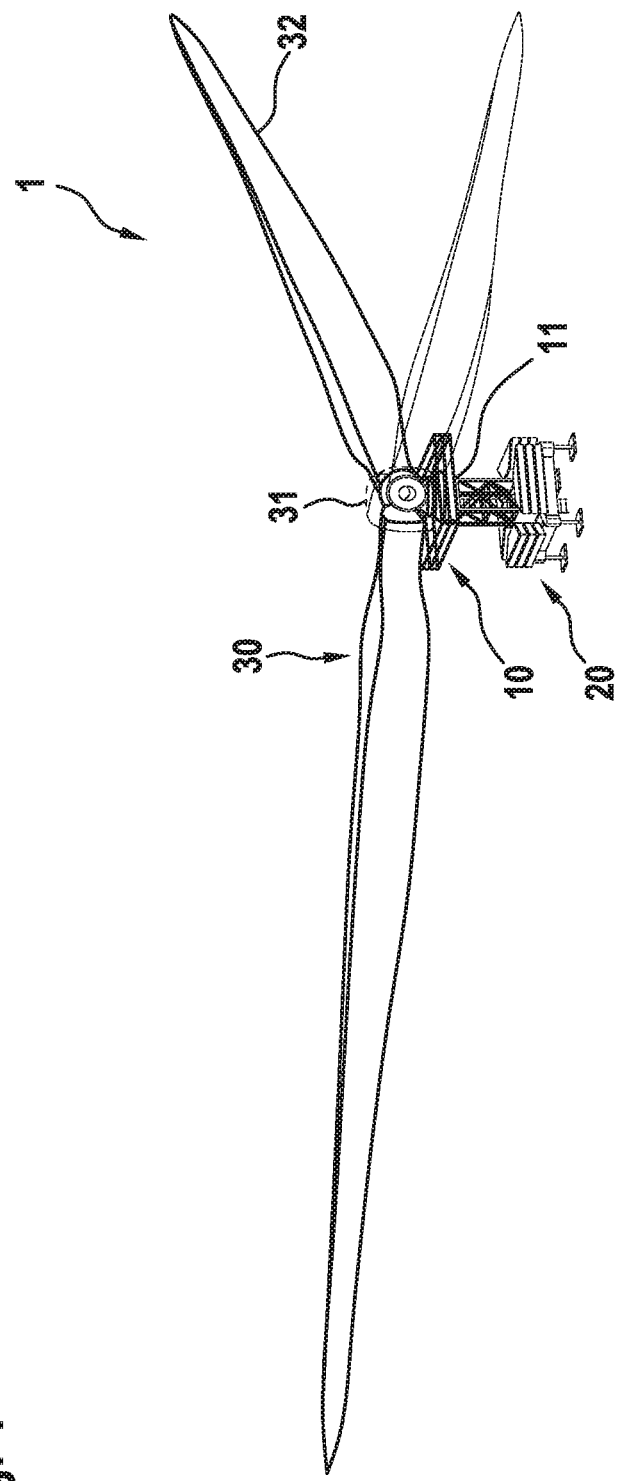
FIG. 1 shows a first exemplary embodiment of an arrangement according to the invention having an adapter device according to the invention and a rotor assembled thereon.

FIG. 1 shows a first exemplary embodiment of an arrangement 1 according to the invention for the horizontal preassembly of a wind turbine rotor. The arrangement 1 comprises an adapter device 10 according to the invention and a tower system 20. The rotor 30 of a wind turbine has already been preassembled on the arrangement 1, wherein the assembly of the rotor 30 takes place in a horizontal position.

Figure 2:
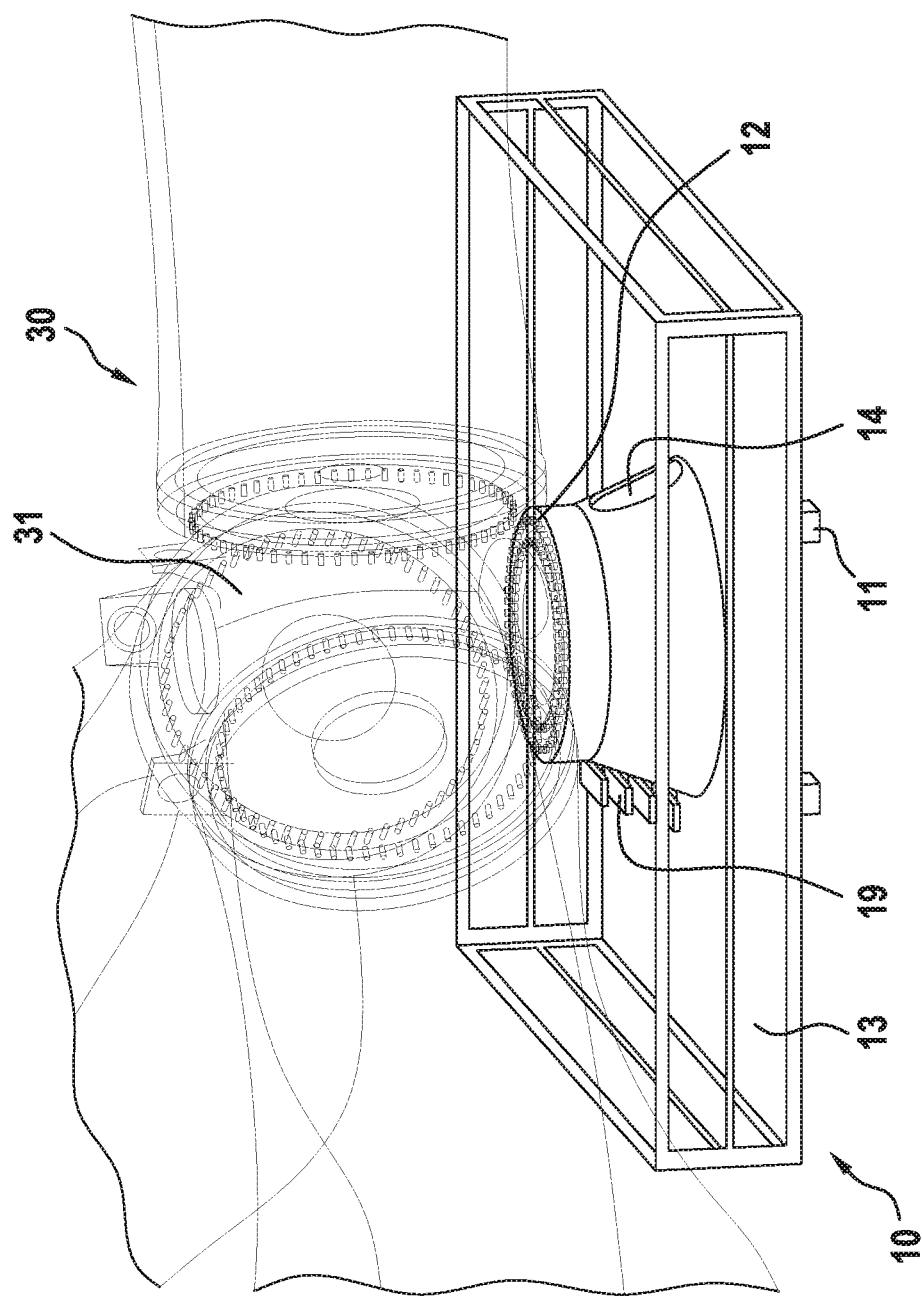
FIG. 2 shows a detailed illustration of the adapter device from FIG. 1.

FIG. 2 illustrates the adapter device 10 from FIG. 1 in more detail.

On its underside, the adapter device 10 has a connection piece 11 with which the adapter device 10 can be fastened to a tower system 20 (cf. FIG. 1). Provided on the top side of the adapter device 10 is a rotor flange 12, to which the rotor hub 31 of the rotor 30 to be assembled can be fastened. For fastening, the rotor hub 31 can be screwed to the rotor flange 12, which, for this purpose, has corresponding through-holes or studs. The connection piece 11 and the rotor flange 12 are arranged coaxially in the exemplary embodiment illustrated, although this is not absolutely necessary.

Provided between the connection piece 11 and the rotor flange 12 is an encircling, HSE-compliant work platform 13. The work platform 13 is in this case arranged far enough beneath the rotor flange 12 for a passage 14 to be able to be provided from the work platform 13 to an access opening (not visible in FIG. 2) in the work platform 13. The access opening is in this case arranged in such a way with respect to the rotor flange 12 and thus also with the connection piece 11 that it corresponds to the ladder system of the tower system 20 and makes it possible, in the arrangement according to the invention (cf. FIG. 1), to reach the work platform 13 through the access opening and the passage 14 via an access ladder 24 (cf. FIG. 3) generally provided on the tower system 20. In the exemplary embodiment illustrated, the access opening is arranged coaxially with the rotor flange 12 and thus also with the connection piece 11.

In order to be able to readily reach the rotor flange 12, or a rotor hub 31 fastened thereto, from the work platform 13, a staircase 19 is provided, which is arranged fixedly on the adapter device 10. Via this staircase 19, the manhole (not illustrated) generally provided on the rotor hub 31 can be reached.

Figure 3:
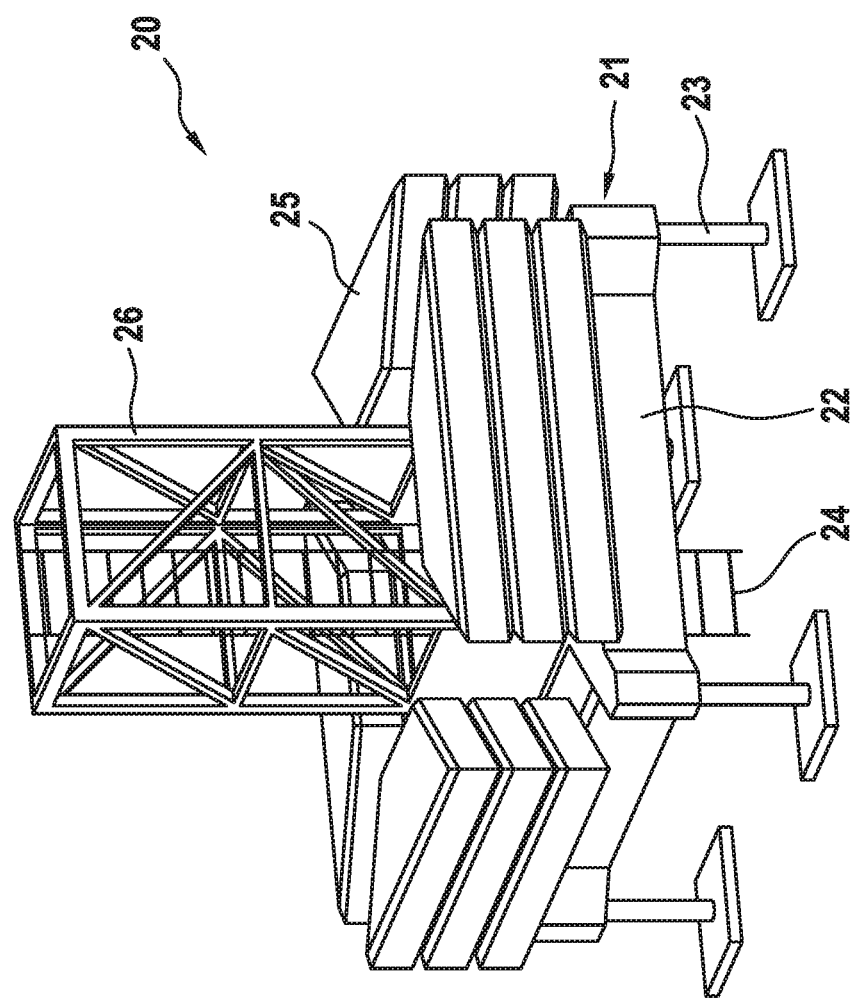
FIG. 3 shows a detailed illustration of the tower system from FIG. 1.

FIG. 3 illustrates the tower system 20, which is used in the arrangement 1 in FIG. 1, in more detail.

The tower system 20 comprises a base segment 21 comprising a cross frame 22 with height-adjustable legs 23 arranged thereon, with which ground irregularities can be compensated. The legs 23 also ensure that the cross frame 22 is at least 1.5 m from the ground, such that the access ladder 24 passing through the inside of the base segment 21 is reachable. Furthermore, the tower system 20 can easily be relocated as a result with a suitable vehicle—for example a truck with a lifting device on its loading bed. This is advantageous in particular in the construction of a wind farm.

The base segment 21 is ballasted with ballast rocks 25 such that sufficient stability of the tower system 20 and of the arrangement according to the invention (cf. FIG. 1) is achieved. The ballasting of the base segment 21 should in this case be selected primarily in dependence on the configuration and the weight of the rotor 30 to be assembled and of the components thereof, in particular the rotor blades 32, in particular also with regard to wind resistance.

Arranged on the base segment 21 is a single tower segment 26. If a relatively great height of the tower system 20 is required, further tower segments 26 can also be provided. The access ladder 24 in this case extends through all of the tower segments 26.

In the arrangement 1 illustrated in FIG. 1, the height of the tower system 20 has been selected such that the clear height beneath the rotor blades 32 of the fully assembled rotor 30 is 10 m, such that the typical construction traffic is not impeded by the erection of wind turbines. At the same time, the rotor 30 on the arrangement 1 is at such a low height that the assembly of the rotor hub 31 and the individual rotor blades 32 can take place with comparatively small cranes, such that a large crane is ultimately required only for lifting the rotor 30 to the gondola of the wind turbine.

FIG. 4 shows a second exemplary embodiment of an arrangement 1 according to the invention made up of an adapter device 10 according to the invention and a tower system 20. This arrangement is largely the same as those in FIGS. 1 to 3, for which reason reference is made to the statements made with regard thereto and only the differences will be dealt with in the following text.

Fastened to the rotor flange 12 of the adapter device 10 is a rotating device 15 which allows rotation of a rotor hub 31 (not illustrated in FIG. 4) arranged thereon about the ultimate rotor axis. A corresponding rotating device 15 makes it possible to fasten the individual rotor blades 32 successively to the rotor hub 31 without the crane required for lifting the rotor blades 32 into position having to be moved. Rather, the rotor hub 31 can be rotated such that all of the rotor blades 32 of the rotor 30 can be assembled at the same location in each case.

In the embodiment according to FIG. 4, the tower system 20 achieves the required stability not by ballasting (cf. FIGS. 1 and 3) but rather by a connection to the foundation 41 of the wind turbine 40 to be erected. To this end, suitable attachment points 42, to which the base segment 21 of the tower system 20 can be connected, are provided in the foundation 41. The attachment points 42 are in this case arranged on the foundation 41 such that the arrangement 1 according to the invention with the adapter device 10 does not impede the construction of the wind turbine 40 and in particular the tower 43 thereof.

The tower system 20 is furthermore connected to the already erected part of the tower 43 of the wind turbine 40, in particular the bottommost segment thereof, via a support 27. To this end, a cross member 28 is fastened to a tower segment 26 of the tower system 20, a collar 29, which is placed around the tower 43 of the wind turbine 40, being located at the free end of said cross member 28. By tightening the collar 29, a force-conducting connection is established between the tower 43 and the arrangement 1 according to the invention, via which, during assembly, any loads on the arrangement 1 can be at least partially transferred.

The adapter device 10 furthermore has a ring 16 mounted in a rotatable manner immediately beneath the rotor flange 12, said ring 16 being able to be rotated in a plane parallel to the fastening surface of the rotor flange 12. Fastened to the ring 16 is an extension arm 17 on which a displacement device 18 is arranged which is displaceable along the longitudinal axis of the extension arm 17. A ballast weight (not illustrated) can be attached to the displacement device 18. As a result of the attachment of a ballast weight to the displacement device 18 and suitable pivoting of the extension arm 17, moments which act on the adapter device 10 during the assembly of the rotor 30, for example when not all of the rotor blades 32 have yet been assembled, can be balanced.

Even though both a support 27 and an extension arm 17 for ballasting are provided in the exemplary embodiment in FIG. 4, only one of the two measures is generally sufficient to give the arrangement 1 according to the invention improved stability. In this case, the support 27 is suitable in particular in arrangements 1 which—as shown in FIG. 4—are arranged immediately on the foundation 41 of the wind turbine 40 to be erected, while moment balancing by ballasting on an extension arm 17 is advantageous in particular in arrangements as illustrated for example in FIG. 1. If, in a corresponding embodiment, moment balancing is provided by the ballasting on an extension arm 17, the ballasting of the base segment 21 of the tower system 20 can generally be reduced.

A common feature of the exemplary embodiments in FIGS. 1 and 4 is that the adapter devices 10 can be collapsed, for transport purposes, to a maximum volume of 2.5 m×2.75 m×10 m. To this end, the adapter devices 10 are configured in a foldable and/or telescopic manner.

The invention claimed is:

1. An arrangement comprising an adapter device that comprises a connection piece on an underside of the adapter device for fastening the adapter device to a tower system of a tower crane, a rotor flange on a top side of the adapter device for fastening a rotor hub of a wind turbine rotor to be assembled, a work platform that surrounds the rotor flange, wherein the work platform is located between the connection piece and the rotor flange and is Health, Safety, and Environment (HSE) compliant, and wherein the rotor flange is elevated with respect to the work platform such that a passage from the work platform to an access opening in the region of the connection piece is provided in the adapter device between the rotor flange and the work platform, and a tower system of a tower crane, wherein the adapter device is fastened to the tower system by way of the connection piece, wherein the adapter device has an extension arm to which a ballast weight for applying a bending moment to the adapter device parallel to the plane of the rotor flange is able to be fastened, and wherein the extension arm has a displacement device for displacing the ballast weight along the longitudinal axis of the extension arm.

2. The arrangement of claim 1, wherein stability of the tower system is achieved via ballasting at a foot of the tower system.

3. The arrangement of claim 1, wherein the tower system is fastened to a foundation of the wind turbine to be erected or is fastened to a separately constructed foundation.

4. The arrangement of claim 1, wherein the adapter device or the tower system is configured to be supported on an at least partially erected tower of the wind turbine.

5. The arrangement of claim 1, wherein the tower system is configured such that a minimum clearance height under a wind turbine rotor assembled on the adapter device is at least 4.5 m, or the maximum height of a wind turbine rotor assembled on the adapter device above the ground is 40 m.

6. The arrangement of claim 1, wherein the extension arm is pivotable parallel to the plane of the rotor flange or is able to be mounted in any one of several defined positions.

7. The arrangement of claim 1, wherein the adapter device is foldable or telescopic such that, in a collapsed state, the adapter device has external dimensions of at most 2.5 m×2.75 m×10 m.

8. The arrangement of claim 1, wherein the adapter device is foldable or telescopic such that, in a collapsed state, the adapter device has external dimensions that are selected such that the adapter device is loadable in a 40 foot container.

9. The arrangement of claim 1, wherein the adapter device is foldable or telescopic such that, in a collapsed state, the adapter device has external dimensions that are selected such that the adapter device is loadable in a 20 foot container.

10. The arrangement of claim 1, wherein the tower system is configured such that a minimum clearance height under a wind turbine rotor assembled on the adapter device is at least 8 m, or the maximum height of a wind turbine rotor assembled on the adapter device above the ground is 35 m.

11. The arrangement of claim 1, wherein the tower system is configured such that a minimum clearance height under a wind turbine rotor assembled on the adapter device is at least 9.5 m, or the maximum height of a wind turbine rotor assembled on the adapter device above the ground is 25 m.

12. The arrangement of claim 1, wherein the connection piece and the rotor flange are arranged substantially coaxially.

13. The arrangement of claim 1, comprising a staircase from the work platform to the rotor flange.

14. The arrangement of claim 1, wherein the extension arm is pivotable parallel to the plane of the rotor flange and is able to be mounted in any one of several defined positions.

15. The arrangement of claim 1, comprising a rotating device fastened to the rotor flange, wherein the rotating device is configured such that the rotor hub of the wind turbine rotor to be assembled is fastenable to the rotating device, and wherein the rotating device allows the rotor hub to rotate in the plane of the rotor flange.

16. The arrangement of claim 1, wherein the adapter device is foldable and telescopic such that, in a collapsed state, the adapter device has external dimensions of at most 2.5 m×2.75 m×10 m.

* * * * *